E. S. HAMPTON.
Dish-Washers.
No. 199,704. Patented Jan. 29, 1878.
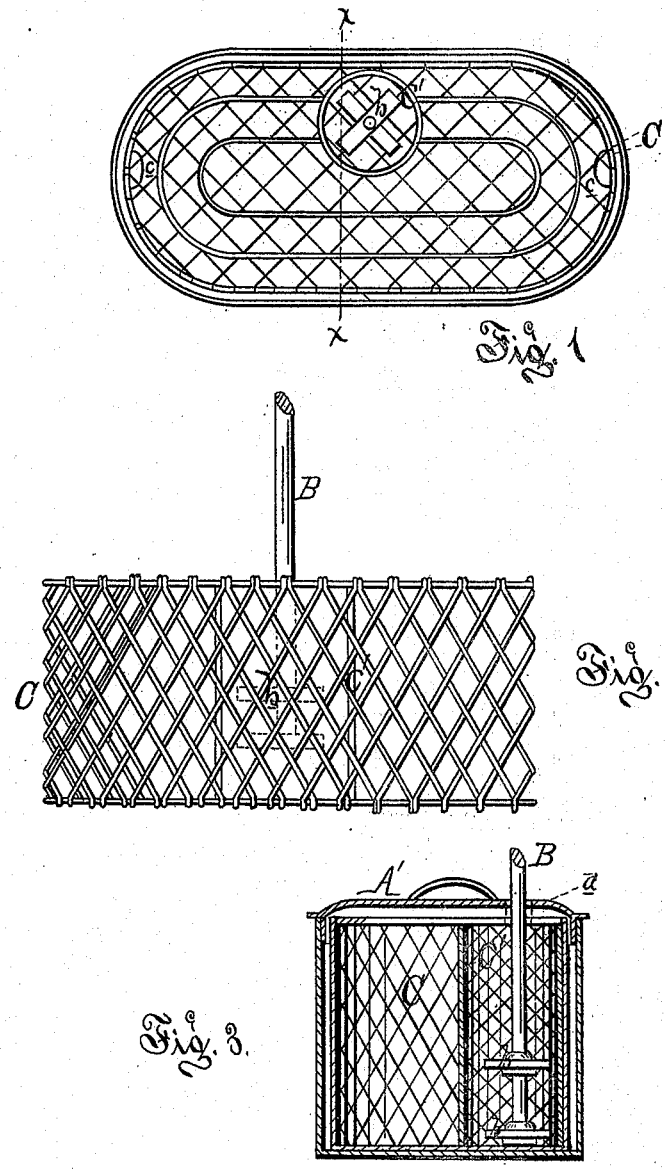

UNITED STATES PATENT OFFICE.

EMMA S. HAMPTON, OF DETROIT, MICHIGAN.

IMPROVEMENT IN DISH-WASHERS.

Specification forming part of Letters Patent No. 199,704, dated January 29, 1878; application filed July 23, 1877.

*To all whom it may concern:*

Be it known that I, EMMA S. HAMPTON, of Detroit, in the county of Wayne and State of Michigan, have invented an Improvement in Dish-Washers, of which the following is a specification:

The nature of my invention relates to an improvement in dish-washers of that class wherein the dishes are cleansed by the violent agitation of the hot water in which they are submerged in a suitable receptacle; and it consists in an open cage fitting into an ordinary wash-boiler, with a smaller cage in the other one, in which the water is agitated by means of a dasher, whose handle passes up through the boiler-cover. The dishes are contained in the larger cage, which may be lifted out with them, and placed to drain and dry off the dishes by evaporation.

Figure 1 is a plan with the boiler-cover removed. Fig. 2 is a detached elevation of the cage. Fig. 3 is a cross-section at $x\ x$.

In the drawing, A represents an ordinary oval wash-boiler, whose cover A' is perforated to allow the handle B of a dash to play through it. The opening is surrounded by a pendent tube, $a$, which serves as a guide, and also to prevent the water from splashing out. The dash is fitted with paddles or dash-floats $b$ at the lower end.

C is an oval cage, of coarsely-woven wire, adapted to fit loosely into the boiler, and is provided with an internal guard-cage, C', at one side, in which the dash plays, and which protects the dishes from the dash. The cage C is provided with two bails, $c\ c$, by which it can be lifted out of the boiler.

The dishes are placed in the cage C, previously set into the boiler, containing enough soap-suds to submerge them, and the latter may be set onto a stove, to boil the water, unless boiling water be used. A few strokes of the dash causes a violent agitation and circulation of the water between the dishes. The cage and contents can then be lifted out and placed in a sink to drain, and the heat of the dishes soon drives off the moisture by evaporation, leaving the dishes dry and thoroughly cleansed.

I prefer to use a flat-bottomed boiler; but a pit-bottomed wash-boiler may be utilized by perforating its cover for the dash, as above described.

What I claim as my invention is—

The cage C, with its guard-cage C' and the dash B, in combination with the boiler A and its perforated cover A', substantially as and for the purpose set forth.

EMMA S. HAMPTON.

Witnesses:
H. S. SPRAGUE,
H. L. AULLS.